United States Patent [19]
Huber

[11] 4,254,853
[45] Mar. 10, 1981

[54] FRICTION CLUTCH

[75] Inventor: Lothar Huber, Bühl/Altschweier, Fed. Rep. of Germany

[73] Assignee: LUK Lamellen und Kupplungsbau GmbH, Bühl, Fed. Rep. of Germany

[21] Appl. No.: 892,925

[22] Filed: Apr. 3, 1978

[30] Foreign Application Priority Data

Apr. 2, 1977 [DE] Fed. Rep. of Germany ....... 2714929

[51] Int. Cl.³ .............................................. F16D 13/50
[52] U.S. Cl. ................................ 192/70.27; 192/89 B
[58] Field of Search ............................ 192/89 B, 70.27

[56] References Cited

U.S. PATENT DOCUMENTS 4,084,674  4/1978  Gennes ............................... 192/89 B

FOREIGN PATENT DOCUMENTS 1775116 10/1976 Fed. Rep. of Germany .
2242892  3/1975 France .................................. 192/89 B Primary Examiner—Rodney H. Bonck
Attorney, Agent, or Firm—Herbert L. Lerner

[57] ABSTRACT

Friction clutch wherein a plate spring is mounted on a clutch component for pivoting relative thereto, the plate spring being held between first bracing means formed on a side of the clutch component and an annular plate-like second bracing means disposed at a side of the plate spring facing away from the clutch component, at least one of the first and second bracing means being yieldable, holding means fastened to the clutch component and extending through the plate spring for bracing the second bracing means against the plate spring, the improvement therein includes a bayonet-like locking connection effective between the holding means and the annular plate-like second bracing means.

20 Claims, 6 Drawing Figures

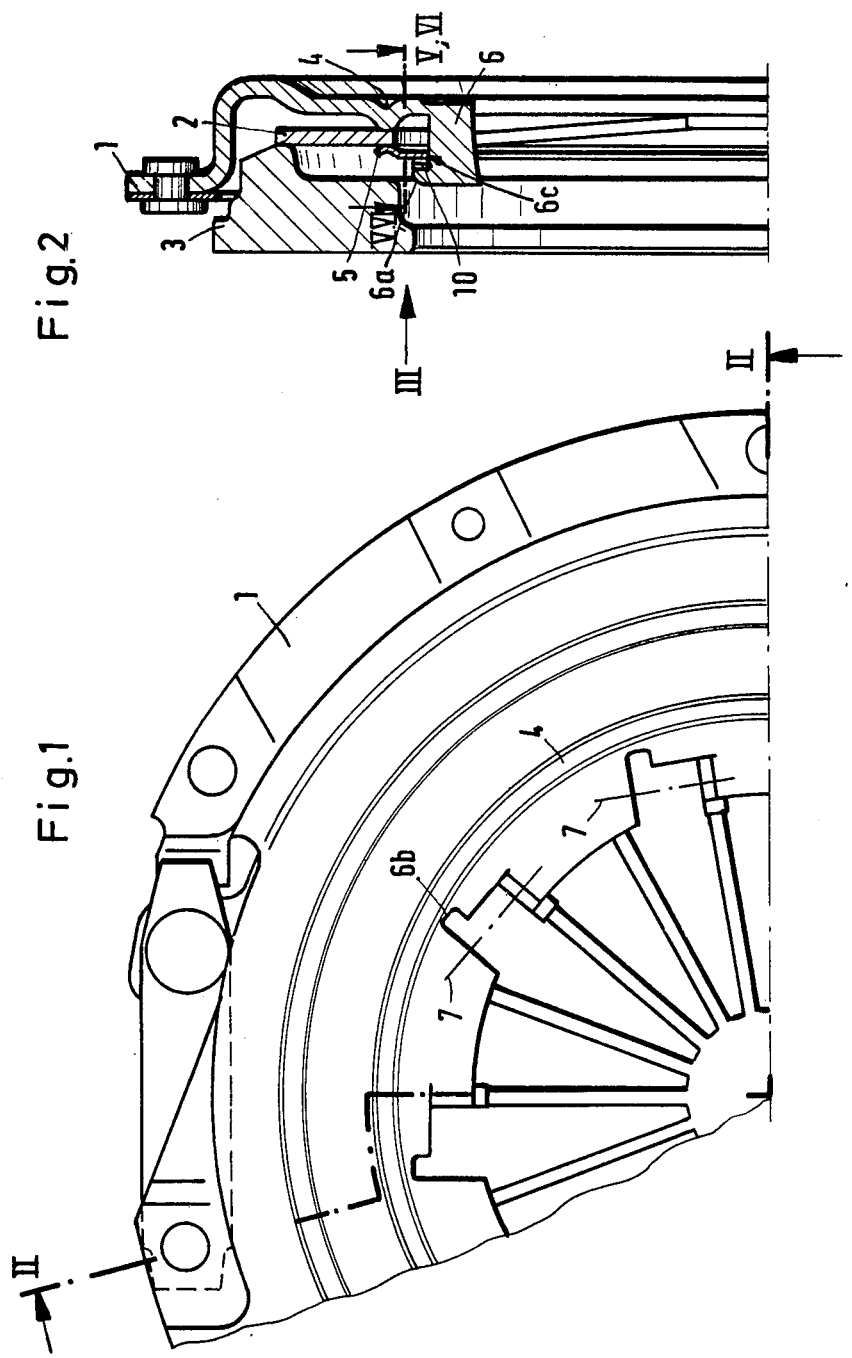

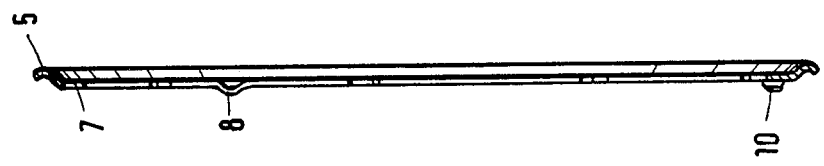
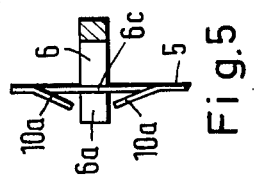
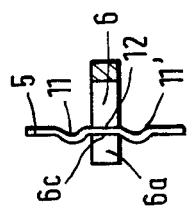
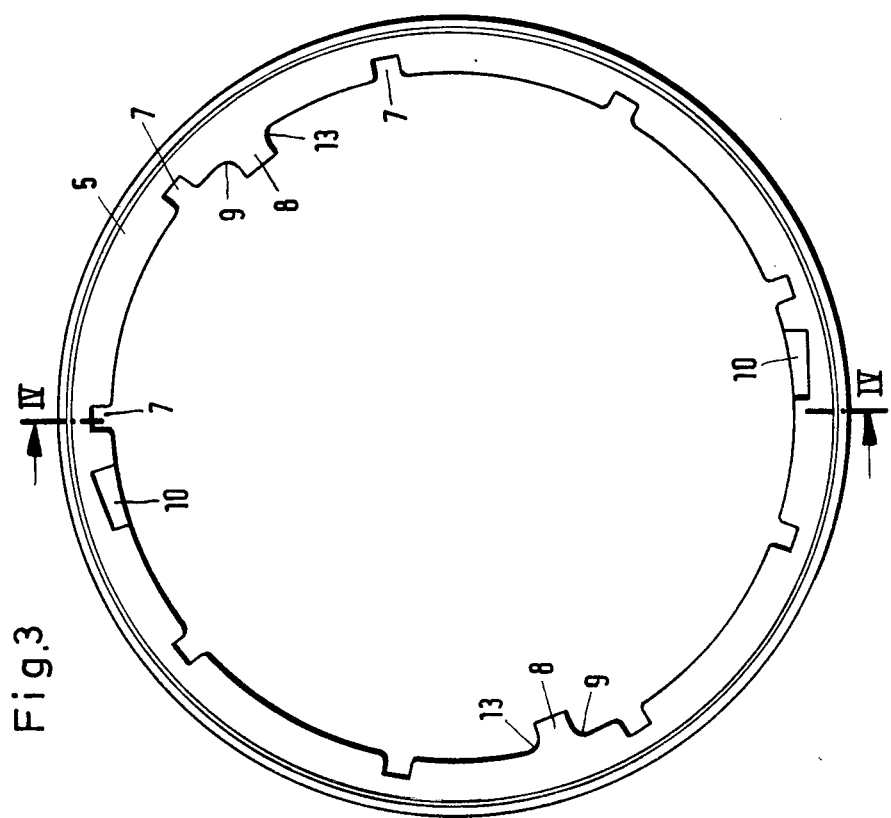

FRICTION CLUTCH

The invention relates to a friction clutch, wherein a plate spring is mounted on a clutch component, such as a cover, for pivoting relative thereto, the plate spring being held between first bracing means formed on a side of the clutch component or on the cover side and annular or substantially circular plate-like second bracing means disposed at a side of the plate spring facing away from the clutch component or cover, at least one of the first and second bracing means being yieldable i.e. resilient or spring-loaded, and holding means fastened to the clutch component or cover and extending through the plate spring for bracing the second bracing means against the plate spring.

In such clutches, as have become known, for example, from German Published Prosecuted Application DT-AS No. 1 775 116, the problem arises of ensuring play-free retainment of the clutch plate spring over the entire period of operation of the clutch, so that relatively easy actuation of the clutch and, furthermore, constant lifting of the clutch pressure plate is afforded. To this end, the bracing facing away from the cover side of the plate spring is spring-loaded and retained by holding means in the form of spacing rivets which are connected to the cover. The resilient or elastic bracing can be effected by providing that the plate-like bracing means per se are a resilient or springy member and directly form the support or bearing for the plate spring, or stress or load a wire-like support, for example, or by providing that the plate-like bracing means supportingly or retainingly brace a resilient member which forms the support or bearing for the plate spring.

It is an object of the invention to provide a friction clutch of the foregoing type, the assembly of which is simplified and facilitated, thereby resulting in more economical production of such friction clutches.

With the foregoing and other objects in view, there is provided, in accordance with the invention, a friction clutch wherein a plate spring is mounted on a clutch component for pivoting relative thereto, the plate spring being held between first bracing means formed on a side of the clutch component and an annular plate-like second bracing means disposed at a side of the plate spring facing away from the clutch component, at least one of the first and the second bracing means being yieldable, holding means fastened to the clutch component and extending through the plate spring for bracing the second bracing means against the plate spring, the improvement therein comprising a bayonet-like locking connection effective between the holding means and the annular plate-like second bracing means, the holding means being formed, for example, of rivets, retaining pins, retaining members punched and bent out of the clutch component such as the clutch cover or the like.

In accordance with another feature of the invention, the second bracing means comprise an annular plate-like member, the holding means being formed with profiled portions constituting one part of the bayonet-like locking connection, and the annular plate-like member being formed with recesses constituting the other part of the bayonet-like locking connection.

In accordance with a further feature of the invention, the bayonet-like locking connection comprises a plug-and-turn connection.

In accordance with an added feature of the invention, the locking means have a protective device for protecting against rotation of the second bracing means with the clutch.

In accordance with an additional feature of the invention, the protective device is operatively associated with the annular plate-like second bracing means and the holding means, or also with the plate spring, the clutch cover and the like.

In accordance with alternate features of the invention, the protective device is effective for protecting against rotation of the second bracing means with the clutch in both rotary directions or only in one rotary direction or a force lock. In accordance with yet another feature of the invention, the second bracing means comprise an annular plate-like bracing member formed with cut-outs at a radially inner contour thereof, the cut-outs having a width, as viewed in circumferential direction of the annular plate-like member, affording sliding of the annular plate-like member in axial direction over the holding means.

In accordance with yet a further feature of the invention, the second bracing means comprise an annular plate-like bracing member formed with contours engageable by a tool for rotation of the annular bracing member relative to the holding means.

In accordance with yet an added feature of the invention the contours are engageable by the tool for rotation of the annular bracing member relative to the holding means in both directions of rotation so as to release or loosen the locking connection.

In accordance with yet additional alternate features of the invention, the contours are formed by hole-like cut-outs or of radially inwardly directed tabs extending from the annular plate-like bracing member.

In accordance with another feature of the invention, the second bracing means comprise an annular plate-like bracing member formed with radial recesses along the inner circumference thereof, the annular plate-like member being formed behind at least one of the radial recesses with an inclined surface rising in axial direction of the clutch, as viewed in circumferential direction of the annular plate-like member.

In accordance with a further feature of the invention, the inclined surface, as viewed in circumferential direction of the annular plate-like member, merges into a reversing surface extending in opposite axial direction. An antirotation protective device can be formed at least in one direction of rotation.

In accordance with an added feature of the invention, in connection with the reversing surface, as viewed in circumferential direction of the annular plate-like member, an additional section is formed on the annular plate-like member and projects in a direction corresponding to the direction in which the inclined surface extends.

In accordance with an additional feature of the invention, the inclined surface is formed of a punched-out section extending substantially in circumferential direction.

In accordance with yet another feature of the invention, an end of the punched-out section directed in one circumferential direction forms an antirotation protective device on a contour of the holding means extending in axial direction, when the annular plate-like second bracing means has been slipped in axial direction over the holding means and relative rotation or turning of this annular plate-like bracing means with respect to the holding means has been effected in accordance with the punched-out section.

In accordance with yet a further feature of the invention, another antirotation protective device is provided at the annular plate-like member and is effective in the other circumferential direction, the other antirotation protective device being symmetric to a symmetry plane extending in radial direction i.e. being a mirror image thereto. Thus, an antirotation protective device effective in both directions of rotation can be provided.

In accordance with yet an added feature of the invention, and in order to minimize wear in such friction clutches and to prevent formation of fretting corrosion, the holding means have a bearing region at which it engages the second bracing means, the bearing region, at least at the surface thereof, having a hardness greater than that at the remaining region of the holding means. This greater hardness can be formed by surface hardening such as induction hardening or by applying a layer of wear-resistant material or the like thereto.

In accordance with another feature of the invention, the clutch component is the clutch cover, and the holding means are formed from the material of the clutch cover and are integral with the clutch cover, the holding means being formed of a section punched out of the cover material in a rotational plane of the clutch and disposed in a direction selected from the group consisting of the circumferential direction of the cover and a chord direction of the cover and diverted out of the rotational plane and into a plane extending substantially in the radial direction, the holding means, at the ends thereof facing away from the clutch cover, being fastened to the annular plate-like second bracing means, these ends of the holding means, for example, forming a bayonet-like locking connection with the second bracing means.

In accordance with a concomitant feature of the invention, the holding means, at the ends thereof facing away from the clutch cover, are formed, for example, at the respective bearing regions with projections extending in radial direction, the projections having retaining contours for retaining the annular plate-like second bracing means.

Other features which are considered as characteristic for the invention are set forth in the appended claims.

Although the invention is illustrated and described herein as embodied in a friction clutch, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a front elevational view of part of a friction clutch constructed in accordance with the invention;

FIG. 2 is a half-sectional view of FIG. 1 taken along the line II—II in direction of the arrows;

FIG. 3 is a front elevational view of a detail of FIG. 2 seen in direction of the arrow III and fully showing a plate-like bracing means thereof;

FIG. 4 is a cross-sectional view of FIG. 3 taken along the line IV—IV in direction of the arrows; and FIGS. 5 and 6 are fragmentary cross-sectional views of FIG. 2, respectively, taken along coincident lines V—V and VI—VI in direction of the arrows showing two different modifications in the structure of the friction clutch.

Referring now to the drawing and first, particularly, to FIGS. 1 and 2 thereof, there is shown a friction clutch according to the invention which is formed, in a conventional manner, of a cover 1 at which a plate spring 2 acting upon a pressure plate 3 is pivotally mounted. For mounting or bearing the plate spring 2, the cover 1 is provided with bracing means in the form of a circular arrangement of corrugations or a bead 4, and annular plate-like bracing means 5 (also see FIGS. 3 and 4) are disposed on the side of the plate spring 2 facing away from the cover 1, the bracing means 5 by itself forming a support or bearing for the plate spring 2 and being retained by holding means 6 that extend through the plate spring 2, the holding means 6 being formed with noses or projections 6a extending in radial direction of the clutch and providing the support or bearing for the annular plate-like bracing means 5.

The holding means 6 are shown, in the illustrated embodiment of FIG. 2, as being formed out of the material of the cover 1, by being stamped or punched out of the cover material in a shape corresponding at least nearly to respective sections 6b extending in circumferential direction of the cover 1 or in accordance with the direction of a chord 7, and these stamped-out sections are then diverted or bent away into a plane that is substantially rectangular to the plane of rotation of the clutch. In order to facilitate and provide a more exact bending of the stamped-out sections, a nominal or desired bending location can be notched which, likewise extends radially, as viewed in direction of the axis, as does the bending or bent away section 6d.

The plate-like bracing means 5, which can itself be formed of resilient or elastic material, is fastened or fixed to the holding means 6 by a bayonet-like locking or latching connection.

As shown especially in FIGS. 3 and 4, the plate-shaped bracing means 5 is provided with one part of the bayonet-like locking connection, and the holding means 6 represent the other part of the bayonet-like locking connection. For this purpose, a recess or cutout 7 is formed in the annular plate-shaped bracing means 5 for each of the holding means 6. By means of these recesses 7, the annular bracing means or ring 5 is able to be slipped in axial direction over the holding means 6. The bracing 5 is also formed with noses or tabs 8 having a stop or detent contour 9 for a conventional tool engageable therewith to turn the ring 5 relatively to the holding means 6 and the cover 1. The bracing means 5 additionally have punched-out sections 10, one of which, after it has slid over one of the noses or projections 6a of the holding means 6 when the ring 5 is turned relative to the clutch and the holding means 6, engages behind the one projection 6a, while the other of the punched-out sections 10 is brought into a position wherein it is likewise directed (in opposite rotary direction) against a radially extending contour of one of the holding means 6, whereby security against rotation of the annular plate-like member 5 with respect to the remaining parts of the clutch, in both rotary directions, is afforded.

The antirotation protective device can also be constructed, however, as shown in FIG. 5, by providing that punched-out tabs 10a come to lie on both sides of one-and-the-same holding means 6 and the nose or projection 6a extending therefrom.

Another embodiment of the antirotation protective device can also be formed, however, by providing beads or corrugations 11, 11' and a raised portion disposed therebetween on the annular plate-like member or ring 5 so as to form a lock with the holding means 6 or the nose or projection 6a thereof.

On the side of the noses or tabs 8 located opposite the contour 9, the annular plate-like member 5 is provided with engagement or abutment regions 13 for a conventional tool, by means of which loosening or releasing of the bracing means or ring 5 from the clutch cover 1 by turning in the opposite rotary direction can be effected, for example, for repair purposes, if the construction of the bayonet-like locking connection of the antirotation device should require this.

In order to prevent the formation of fretting corrosion and wear between the annular plate-like member 5 and the holding means 6, the latter can have, at least in the region thereof that is engageable with the annular plate-like member 5, a hardness that is greater than that at all the other regions thereof. This can be effected, for example, by induction hardening or the like, or by applying a layer of wear-resistant material thereat.

As noted hereinbefore, the invention of the instant application is not limited to the illustrated embodiments but rather encompasses all embodiments of bayonet-like locking or latching connections between bracing means for the plate spring, on the one hand, and the holding or retaining means, on the other hand, which can also be of different construction than as illustrated and described herein. Such other holding means can, for example, be spacer or rivet pins or bolts or flat rivet pins, or can be formed out of the material of the clutch cover and extend in radial direction.

There is claimed:

1. Friction clutch wherein a plate spring is mounted on a clutch component for pivoting relative thereto, the plate spring being held between first bracing means formed on a side of the clutch component and an annular plate-like second bracing means disposed at a side of the plate spring facing away from the clutch component, at least one of the first and second bracing means being yieldable, holding means fastened to the clutch component and extending through the plate spring for bracing the second bracing means against the plate spring, the improvement therein comprising a bayonet-like locking connection effective between the holding means and the annular plate-like second bracing means.

2. Friction clutch according to claim 1 wherein said second bracing means comprise an annular plate-like member, said holding means being formed with profiled portions constituting one part of said bayonet-like locking connection, and said annular plate-like member being formed with recesses constituting the other part of said bayonet-like locking connection.

3. Friction clutch according to claim 2 wherein said bayonet-like locking connection comprises a plug-and-turn connection.

4. Friction clutch according to claim 1 wherein said locking connection includes a protective device for protecting against rotation of said second bracing means with the clutch.

5. Friction clutch according to claim 4 wherein said protective device is operatively associated with said annular plate-like second bracing means and said holding means.

6. Friction clutch according to claim 4 wherein said protective device is effective for protecting against rotation of said second bracing means in either rotary direction with the clutch.

7. Friction clutch according to claim 4 wherein said protective device is a latching or locking device.

8. Friction clutch according to claim 1, wherein said second bracing means comprise and annular plate-like bracing member formed with cut-outs at a radially inner contour thereof, said cut-outs having a width, as viewed in circumferential direction of said annular plate-like member, affording sliding of said annular plate-like member in axial direction over said holding means.

9. Friction clutch according to claim 1 wherein said second bracing means comprise an annular plate-like bracing member formed with contours engageable by a tool for rotation of said annular bracing member relative to said holding means.

10. Friction clutch according to claim 9 wherein said contours are engageable by the tool for rotation of said annular bracing member relative to said holding means in both directions of rotation.

11. Friction clutch according to claim 9 wherein said contours are formed of radially inwardly directed tabs extending from said annular plate-like bracing member.

12. Friction clutch according to claim 4 wherein said second bracing means comprise an annular plate-like bracing member formed with radial recesses along the inner circumference thereof, said annular plate-like member being formed behind at least one of said radial recesses with an inclined surface rising in axial direction of the clutch, as viewed in circumferential direction of said annular plate-like member.

13. Friction clutch according to claim 12 wherein said inclined surface, as viewed in circumferential direction of said annular plate-like member, merges into a reversing surface extending in opposite axial direction.

14. Friction clutch according to claim 13 wherein, in connection with said reversing surface, as viewed in circumferential direction of said annular plate-like member, an additional inclined surface is formed on the annular plate-like member and projects in a direction corresponding to the direction in which the first-member inclined surface extends.

15. Friction clutch according to claim 12 wherein said inclined surface is formed of a punched-out section extending substantially in circumferential direction.

16. Friction clutch according to claim 15 wherein an end of said punched-out section directed in one circumferential direction forms an antirotation protective device on a contour of said holding means extending in axial direction.

17. Friction clutch according to claim 16 including another antirotation protective device provided at said annular plate-like member and effective in the other circumferential direction, said other antirotation protective device being symmetric to a symmetry plane extending in radial direction.

18. Friction clutch according to claim 1 wherein said holding means have a bearing region at which it engages said second bracing means, said bearing region, at least at the surface thereof, having a hardness greater than that at the remaining region of said holding means.

19. Friction clutch according to claim 1 wherein the clutch component is the clutch cover and said holding means are formed from the material of the clutch cover and are integral with the clutch cover, said holding means being formed of a section punched out of the cover material in a rotational plane of the clutch and disposed in a direction transverse to radial direction of the cover, said punched out section being diverted out of said rotational plane and into a plane extending substantially in radial direction, said holding means, at the ends thereof facing away from the clutch cover, being fastened to said annular plate-like second bracing means.

20. Friction clutch according to claim 19 wherein said holding means, at said ends thereof facing away from the clutch cover, are formed with retaining contours for retaining said annular plate-like second bracing means, said contours being disposed on projections extending from said ends in radial direction.

* * * * *